United States Patent [19]

McAuliffe

[11] 4,397,039

[45] Aug. 2, 1983

[54] INSTANTANEOUS PHASE TRACKING IN SINGLE SIDEBAND SYSTEMS

[75] Inventor: Gerald K. McAuliffe, Boulder, Colo.

[73] Assignee: International Business Machines Corporation, Armonk, N.Y.

[21] Appl. No.: 221,151

[22] Filed: Dec. 29, 1980

[51] Int. Cl.³ .................... H04B 1/10; H04B 1/26
[52] U.S. Cl. .................... 455/202; 329/50; 375/77; 375/119; 455/203; 455/263; 455/265
[58] Field of Search .................. 455/46, 47, 202, 203, 455/258, 261, 263–265, 296, 303, 304, 305; 375/43, 77, 97, 99, 102, 118, 119; 329/50, 154

[56] References Cited

U.S. PATENT DOCUMENTS

| | | | |
|---|---|---|---|
| 2,943,193 | 6/1960 | Webb | 455/203 |
| 3,286,183 | 11/1966 | Bergemann | 455/202 |
| 3,331,025 | 7/1967 | Rameau | 455/203 |
| 3,518,680 | 6/1970 | McAuliffe | 370/20 |
| 3,675,131 | 1/1972 | Pickholtz | 375/77 |
| 3,701,948 | 10/1972 | McAuliffe | 375/77 |
| 3,878,468 | 4/1975 | Falconer et al. | 375/15 |
| 3,971,996 | 1/1976 | Motley et al. | 375/39 |
| 4,028,626 | 6/1977 | Motley et al. | 375/15 |

OTHER PUBLICATIONS

Spaulding, D. A., "A New Digital Coherent Demodulator", vol. 1, COM-21, No. 3, Mar. 1973, pp. 237–238.

H. Kobayashi, "Simultaneous Adaptive Estimation and Decision Algorithm for Carrier Modulated Data Transmission Systems", IEEE Transactions on Communication Technology, vol. COM-19, No. 3, Jun. 1971, pp. 268–280.

*Primary Examiner*—Marc E. Bookbinder
*Attorney, Agent, or Firm*—Homer L. Knearl; Mitchell S. Bigel; Joseph F. Villella

[57] ABSTRACT

A receiver for demodulating a single sideband signal which is subject to rapid phase jitter employs a Hilbert splitter for obtaining the Hilbert transform of the single sideband signal, and a local oscillator for signal demodulation. A post-oscillator feedback loop instantaneously derives the amount of phase jitter in the single sideband signal, and employs the derived phase jitter to adjust the phase of the local oscillator so that the local oscillator tracks the single sideband signal.

Instantaneous derivation of the phase jitter is obtained because all post-oscillator signal manipulations are algebraic; post-oscillator Hilbert transform generation is not required. A first embodiment derives the exact amount of phase jitter. A second embodiment, more simple than the first, derives the approximate amount of phase jitter.

28 Claims, 2 Drawing Figures

INSTANTANEOUS PHASE TRACKING IN SINGLE SIDEBAND SYSTEMS

TECHNICAL FIELD

This invention generally relates to the reception and demodulation of single sideband transmissions, and more particularly to a receiver for demodulating suppressed carrier single sideband data subject to rapidly varying phase jitter.

Single sideband communication systems are very well known in the art. Basically, a single sideband signal is an amplitude modulated baseband signal in which the carrier and one of the sidebands thereof are suppressed. As is well known, the demodulation of a single sideband signal requires a synchronous reference, usually in the form of a local oscillator, of the same frequency and phase as the carrier upon which the baseband signal was modulated. To the extent that the local oscillator differs from the modulated carrier in phase, inaccurate demodulation will result. High speed data transmission systems in particular, require extremely precise synchronization of the local oscillator to properly demodulate the data signal.

Prior art single sideband data transmission systems employed various techniques for maintaining local oscillator synchronization. In some systems a carrier or pilot tone was transmitted along with the single sideband signal. In other systems a vestige of the suppressed sideband was transmitted along with the single sideband signal. As a consequence, both of these prior art systems required additional bandwidth for transmitting the carrier tone or vestigial sideband. For high speed data transmission this added bandwidth has simply not been available. Further, the transmission of the carrier tone or vestigial sideband is wasteful of power and gives rise to intermodulation and other distortions which further degrade demodulation. As a result of the above discussed problems, single sideband systems have been little used for high speed data transmission, despite the inherent advantages of single sideband transmission.

BACKGROUND ART

A single sideband data transmission system which does not require the transmission of a carrier or vestigial sideband for synchronizing the local oscillator is described in U.S. Pat. No. 3,675,131 to Pickholtz. Pickholtz uses a feedback system to generate a phase error signal for correcting the phase of the local oscillator in response to the phase jitter in the single sideband signal. Rather than being derived from a carrier tone or vestigial sideband, the phase error signal is derived from the single sideband input signal itself.

In Pickholtz, the received single sideband signal is demodulated, and its in-phase component and quadrature component is obtained. A detector circuit detects the baseband waveform from the in-phase demodulated component. Another component of the phase error signal is proportioned to the Hilbert transform of the baseband data waveform. This component is obtained by passing the in-phase demodulated component through a detector, for detecting the baseband data waveform, and passing the detected baseband data waveform through a Hilbert transform generator. The phase error signal, derived from the in-phase and quadrature demodulated components and the Hilbert transform of the baseband data waveform is fed back to the local oscillator. The phase of the local oscillator is then adjusted to synchronize with the jittering phase of the received single sideband input signal.

The Pickholtz system is incapable of tracking rapid phase jitter. This will become apparent by considering the above description of the Pickholtz system. As was described, part of the phase error signal fed back to the local oscillator is the Hilbert transform of the baseband data waveform. As is well known to those skilled in the art, the Hilbert transform is equivalent to a 90° phase shift of all frequency components. A 90° phase shift may only be obtained by an infinite delay. A practical approximation may be obtained after a finite delay, provided the spectral components of the signal do not extend down to DC. Because generation of the Hilbert transform involves a delay, Pickholtz adds an equal delay to the in-phase and quadrature demodulated components in forming the phase error signal.

The presence of these delays in generating the phase error signal prevents the Pickholtz system from tracking rapid phase jitter. Suppose, the received single sideband input wave is subject to rapid phase jitter. The Pickholtz system will generate a phase error signal to adjust the phase of the local oscillator to synchronize with the jittered phase of the input single sideband signal. Since the phase error signal is generated in part by taking the Hilbert transform of the detected baseband data waveform, an appreciable delay will occur before the phase error signal is generated. For rapid phase jitter, the input signal will have jittered to a different value by the time the phase error signal is generated. The phase jitter which was to be corrected has in effect already passed by the time the phase error signal is generated. The delay inherent in the Pickholtz feedback loop will never allow the system to generate the phase error signal in time to compensate for the rapidly changing phase jitter.

Unfortunately, when transmitting data over telephone lines, a phase jitter of a few degrees having a frequency of up to 180 Hz is typically encountered. Because of the inherent delays in the Pickholtz feedback loop, the Pickholtz system is inadequate in maintaining local oscillator synchronization when the input signal undergoes such rapid phase jitter. As a result, single sideband systems still cannot be used for high speed data transmission over poorer telephone lines.

DISCLOSURE OF THE INVENTION

It is a principle object of the invention to provide a single sideband receiver for demodulating suppressed carrier single sideband data.

It is another object of the invention to provide a single sideband receiver for demodulating suppressed carrier single sideband data which is subject to rapid phase jitter.

These and other objects are accomplished by a single sideband receiver which does not require Hilbert transformation within the error correcting feedback loop generating the phase error signal. By appropriate manipulation of only three waveforms; i.e., the in-phase demodulated wave, the quadrature demodulated wave and a detected baseband wave, all derived from the single sideband input signal and the local oscillator, the phase error signal may be generated. Since the phase error signal is generated without requiring a Hilbert transformation, the phase error signal is substantially without time delay with respect to the local oscillator and may instantly adjust the phase of the local oscillator to compensate for the rapid phase jitter.

Two embodiments of the invention are shown. In both the embodiments, the single sideband input signal is initially passed through a Hilbert splitter. The Hilbert splitter generates the Hilbert transform of the single sideband input signal and a replica of the single sideband input signal with no delay between the generated signals. The two outputs of the Hilbert splitter are combined with the local oscillator to generate an in-phase demodulated component wave and a quadrature demodulated component wave. Generation of the in-phase and quadrature demodulated component waves takes place with no delay relative to the local oscillator. The in-phase demodulated component wave is passed through a detector to obtain the baseband data wave.

In a first embodiment of the invention, the in-phase and quadrature demodulated component waves and the baseband data wave are combined to obtain a phase error signal which exactly compensates for phase jitter. The combination is purely algebraic, not involving generation of a Hilbert transform or other delays. The phase error signal is fed back to the local oscillator to adjust the phase thereof to exactly compensate for the rapid phase jitter.

In a second embodiment of the invention, the in-phase and quadrature demodulated component waves and the baseband data wave are combined to obtain a phase error signal. This phase error signal is only an approximation of the actual input signal phase jitter. However, for the small values of phase jitter typically encountered in data transmission over telephone lines, this approximation is very good indeed. The circuitry required to generate the approximate phase error signal is greatly simplified compared to the circuitry required to generate the exact phase error signal in the first embodiment.

It will be noted that in both embodiments there is delay at the input of the receiver in generating the Hilbert transform of the single sideband input signal. However, this delay at the input of the receiver occurs before the input single sideband wave is demodulated by the local oscillator. From the point in the receiver at which the local oscillator is first employed for demodulation, until the point where the phase of the local oscillator is adjusted, the various waveforms undergo purely algebraic manipulations and are not subject to delay. The local oscillator is corrected instantaneously, and therefore tracks rapid phase jitter. To reiterate, there is no delay in the phase error signal generating feedback loop. The only delay encountered is at the input end of the system, prior to demodulation by the local oscillator.

BEST MODE FOR CARRYING OUT THE INVENTION

Single Sideband Modulation

Various techniques for modulating a baseband waveform to generate a single sideband signal are known to those skilled in the art. One method, generally called the filter method, involves the multiplication of a baseband waveform f(t) with a carrier of frequency $\omega$ filtering out the carrier and one of the generated sidebands. A second method, generally called the phasing method, involves the multiplication of in-phase and quadrature components of the baseband waveform f(t) by in-phase and quadrature components of a carrier of frequency $\omega$. For either method, and any other single sideband modulating method, the single sideband signal may be represented by $$s(t) = f(t) \cos \omega t = \hat{f}(t) \sin \omega t \qquad (1)$$

where s(t) represents the single sideband signal, f(t) is the baseband data waveform; $\omega$ is the carrier frequency and $\hat{f}(t)$ is the Hilbert transform of f(t). As is well known to those of skill in the art of communication systems, the Hilbert transform of f(t) is defined by $$\hat{f}(t) = -\frac{1}{\pi} \int_{-\infty}^{+\infty} \frac{f(\lambda) \, d\lambda}{t - \lambda} \qquad (2)$$

and may be thought of as the 90° phase shifted version of the input waveform.

It will also be noted by those having skill in the art that the single sideband signal s(t) described here is lower sideband. For upper sideband, a positive instead of a negative sign would be used in Equation (1). Since the choice of sideband is arbitrary, the analysis below will assume lower sideband.

Single Sideband Demodulation

There are likewise various techniques for demodulating a single sideband input signal. One technique involves multiplication of the received single sideband input signal by a local oscillator of frequency $\omega$ and low pass filtering to yield the baseband data waveform. As is well known, any filter inherently creates a delay. In the above described technique, the delay occurs after multiplication by the local oscillator. Use of this technique in the receiver of the invention would preclude instantaneous generation of the phase error signal. Hence the above demodulation technique is not used in this invention.

To demodulate a single sideband input signal without the use of filters the Hilbert transform $\hat{s}(t)$ of the input single sideband signal s(t) is first generated. In this invention, a Hilbert splitter is employed at the input end of the receiver for this purpose, as will be described below. The Hilbert transform of the single sideband input signal may be mathematically expressed, by taking the Hilbert transform of Equation (1) using the Hilbert transforms of well known functions as listed in a table of Hilbert transforms, for example, IEEE Transactions on Communications, Vol. Com-20, No. 6, December 1972, pages 1194–1198 as $$\hat{s}(t) = -f(t) \sin \omega t - \hat{f}(t) \cos \omega t \qquad (3)$$

The Hilbert splitter also generates a replica of single sideband input signal s(t), in synchronism with generated Hilbert transform $\hat{s}(t)$.

Having the single sideband signal s(t) and the Hilbert transform $\hat{s}(t)$ of the single sideband signal in synchronism, demodulation takes place by multiplying s(t) by the in-phase component of the local oscillator $\cos \omega t$ and s(t) by the quadrature phase component of the local oscillator $\sin \omega t$ as follows:

$$x(t) = s(t) \cos \omega t - \hat{s}(t) \sin \omega t \qquad (4)$$

That x(t), the resultant in-phase demodulated component is equal to the baseband data waveform may be seen by substituting Equations (1) and (3) into (4), and cancelling terms as follows:

$$x(t) = f(t) \cos^2 \omega t - \hat{f}(t) \sin \omega t \cos \omega t + f(t) \sin^2 \omega t + \hat{f}(t) \cos \omega t \sin \omega t = f(t) [\cos^2 \omega t + \sin^2 \omega t] = f(t) \qquad (5)$$

Thus, single sideband demodulation without post-oscillator filtering may be accomplished by taking the Hilbert transform of the input single sideband signal, multiplying input single sideband signal by the in-phase local oscillator component, multiplying the Hilbert transform by the quadrature local oscillator component and subtracting the results from one another.

It will be noted that the quadrature component y(t) of s(t) may be recovered without post-oscillator filtering in an analagous way as follows:

$$y(t) = -s(t) \sin \omega t = \hat{s}(t) \cos \omega t \qquad (6)$$

Substituting Equations (3) and (4) into Equation (6) and cancelling terms will show that the expression of Equation (6) is equal to $\hat{f}(t)$, the Hilbert transform of the baseband data waveform.

Single Sideband Demodulation with Phase Error

The above analysis assumed no phase error in the single sideband signal. However, single sideband transmission over telephone lines can impart a phase jitter of small amplitude ($\pm$ a few degrees) and high frequency (e.g., 180 Hz). The effect of phase errors on the above demodulation technique will now be analyzed.

Phase (and frequency) offset results in $\omega t$ being replaced by $\omega t + \phi$ in equation (4):

$$x(t) = s(t) \cos (\omega t + \phi) - \hat{s}(t) \sin (\omega t + \phi) \qquad (4a)$$

Expanding terms as was done with respect to Equation (5) we obtain for the in-phase component of the demodulated single sideband input waveform $$x(t) = f(t) \cos \phi + \hat{f}(t) \sin \phi \qquad (5a)$$

It is seen that because of the phase error, the in-phase demodulated component x(t) is no longer equal to the baseband waveform f(t). In a like manner we obtain for the quadrature component of the demodulated single sideband waveform $$y(t) = -f(t) \sin \phi + \hat{f}(t) \cos \phi \qquad (6a)$$

Deriving the Phase Error

Upon demodulation, the values of the in-phase demodulated component x(t) and the quadrature demodulated component y(t), are known. The value of the baseband data wave f(t) may be derived from the in-phase demodulated component x(t) by passing x(t) through a detector.

Detectors are well known to those skilled in the art, and will be described further below. As a result of demodulation and detection, the values of x(t), y(t) and f(t) are obtained without the introduction of post-oscillator delay. Upon examining Equations (5a) and (6a), it will be seen that to obtain the value of the phase error $\phi$, the value of $\hat{f}(t)$ is required. As was discussed above, generating $\hat{f}(t)$, the Hilbert transform of the baseband data wave f(t), requires the introduction of a delay. The introduction of such a delay in deriving $\phi$ will preclude $\phi$ from tracking rapid phase jitter. This is the problem encountered in Pickholtz. The value of $\hat{f}(t)$ is required in order to determine $\phi$, and the value of $\hat{f}(t)$ cannot be obtained without introducing a delay. When $\phi$ is finally determined and fed back to the local oscillator, it is too late to correct the oscillator for the phase error.

In order to track rapid phase jitter, the value of $\phi$ must be obtained without introducing delay. This precludes the generation of $\hat{f}(t)$. However, $\phi$ may be obtained without knowing the value of $\hat{f}(t)$ in the following manner. Rearranging the terms of Equations (5a) and (6a) results in $$\hat{f}(t) \sin \phi = x(t) - f(t) \cos \phi \qquad (5b)$$

and $$\hat{f}(t) \cos \phi = y(t) + f(t) \sin \phi \qquad (6b)$$

Dividing Equation (5b) by (6b) yields $$\frac{\sin \phi}{\cos \phi} = \frac{x(t) - f(t) \cos \phi}{y(t) + f(t) \sin \phi} \qquad (7)$$

Cross multiplying Equation (7) and using the trignometric identity $\sin^2 \phi + \cos^2 \phi = 1$ yields $$y(t) \sin \phi + f(t) = x(t) \cos \phi \qquad (8)$$

From Equation (8) it is apparent that we have eliminated the $\hat{f}(t)$. The need to derive the Hilbert transform $\hat{f}(t)$ with its consequent undesirable delay has thus been eliminated. To reiterate: $\hat{f}$ has been eliminated from all calculations of $\phi$.

Equation (8) may be solved for $\phi$. Squaring (8), substituting $1 - \sin^2 (\phi)$ for $\cos^2 (\phi)$ and rearranging terms yields the quadratic equation $$[[x(t)]^2 + [y(t)]^2] \sin^2 \phi + 2y(t)f(t) \sin \phi + [f(t)]^2 - [x(t)]^2 = 0 \qquad (9)$$

Applying the quadratic formula to solve for $\sin \phi$ (and then $\phi$) yields $$\phi = \arcsin \left[ \frac{-y(t)f(t) \pm x(t)\sqrt{[x(t)]^2 + [y(t)]^2 - [f(t)]^2}}{[x(t)]^2 + [y(t)]^2} \right] \qquad (10)$$

It will be noted that the solution for $\phi$ has two possible values; i.e., that obtained by using a plus sign or a minus sign before the square root term of Equation (10). Either value may be used as the phase error signal. However, to more accurately track phase jitter, the smaller of the two values is preferred. For particular values of x(t), y(t) and f(t) the smaller value may be obtained, for example, by generating both values and comparing their magnitudes. Alternatively, the sign of the square root term of Equation (10) may be chosen to correspond to the sign obtained when x(t), y(t) and f(t) are multiplied together. This will always yield the smaller value for $\phi$.

Approximate Determination of Phase Error Signal

The value of the phase error signal $\phi$, given by Equation (10) may be generated solely by algebraic manipulation of te known values of x(t), y(t) and f(t) without the introduction of delay. However, it will be recognized that circuitry for generating the function of Equation (10) will be fairly complex. In designing a low cost single sideband receiver it would be desirable to generate phase error $\phi$ from x(t), y(t) and f(t) without generating the function of Equation (10).

A simplified expression for $\phi$ may be derived if one takes the typical characteristics of phase jitter into account. As was previously discussed, on telephone lines, phase jitter is typically of small amplitude (i.e., ± a few degrees), although rapid (e.g., on the order of 180 Hz). By utilizing the fact that the value of $\phi$ is typically only a few degrees a simplified expression for $\phi$ may be obtained. Equation (8) may be rearranged as $$\sin\phi = \frac{x(t)\cos\phi - f(t)}{y(t)} \quad (11)$$

As is well known in the art, when an angle $\phi$ is small $$\sin\phi \approx \phi; \cos\phi \approx 1 \quad (12)$$

Substituting these relations into Equation (11) yields:

$$\phi \approx \frac{x(t) - f(t)}{y(t)} \quad (13)$$

This function may be implemented via subtraction and division circuits.

Equation (8) may be combined with other previous equations and the approximations of Equation (12) substituted into the result to obtain other simplified expressions for $\phi$. As long as $\phi$ is expressed as a function of f(t), y(t), and x(t), $\phi$ may be obtained without delay and rapid phase jitter may be tracked.

Single Sideband Receiver Employing a First Embodiment of the Invention

Figure 1:
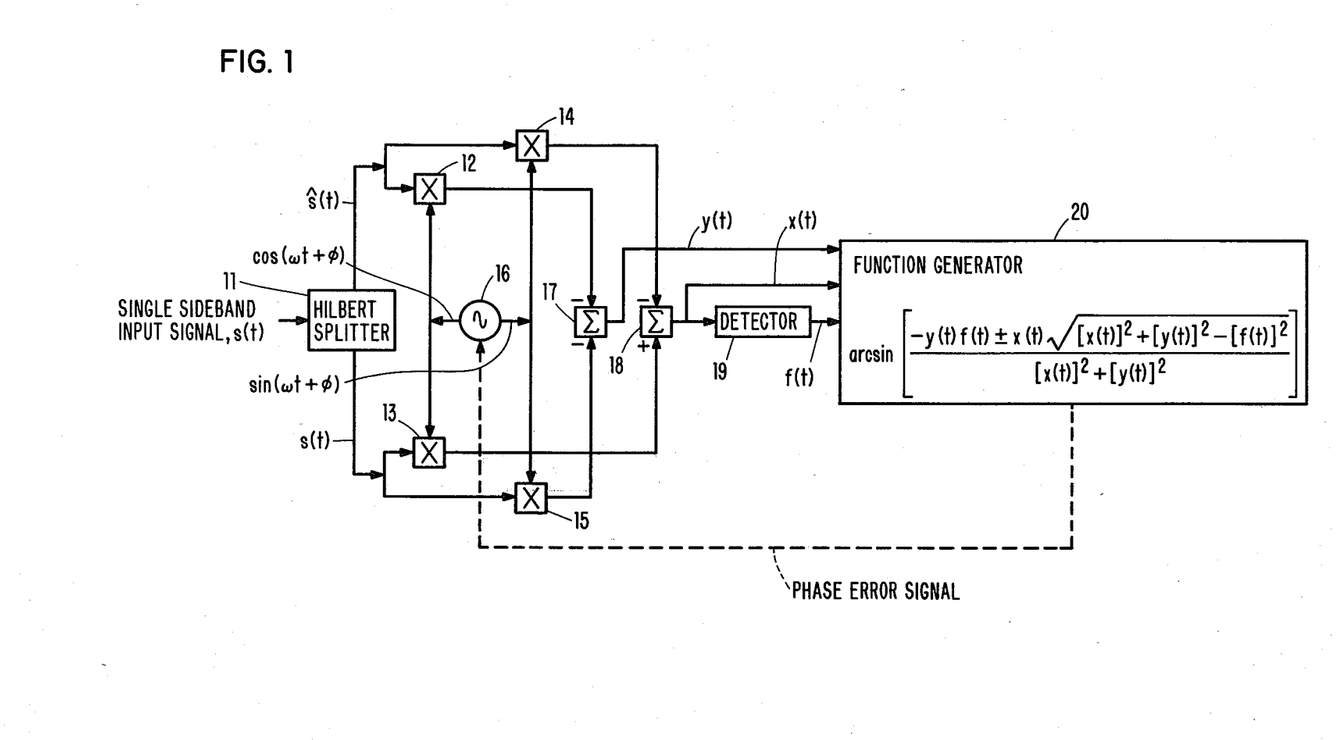
FIG. 1 is a block diagram of a first embodiment of the single sideband receiver of the invention.

FIG. 1 illustrates a single sideband receiver employing a first embodiment of the invention. The single sideband receiver comprises a Hilbert splitter 11, four multipliers 12, 13, 14 and 15, two summers 17 and 18, detector 19 and function generator 20.

Single sideband input signal s(t) is received at the input of Hilbert splitter 11. Hilbert splitter 11 outputs the Hilbert transform ŝ(t) of the single sideband input wave s(t), and the input wave s(t) itself, with s(t) and ŝ(t) being in synchronization, i.e., there is no delay between s(t) and ŝ(t) at the output of Hilbert splitter 11.

As is known to those skilled in the art, the generation of a Hilbert transform necessarily requires delay. In order to provide s(t) and ŝ(t) with no time delay therebetween, s(t) is delayed within the Hilbert splitter by an amount equal to the time required to generate ŝ(t).

In the embodiment of FIG. 1, Hilbert splitter 11 is placed at the input end of the receiver and not within the post-oscillator feedback loop. The delay introduced by Hilbert splitter has no effect on the operation of the post-oscillator phase error adjusting feedback loop. As is known to those skilled in the art, Hilbert splitter 11 may comprise a 90° phase shifter and a suitable delay line in parallel therewith. For purposes of this invention, any type Hilbert splitter may be employed.

Local oscillator 16 may be implemented via a crystal oscillator, sine wave generator, read only memory table lookup or various means. Local oscillator 16 has two outputs; an in-phase output at carrier frequency $\omega$ represented in FIG. 1 by $\cos(\omega t+\phi)$ and a quadrature phase output at carrier frequency $\omega$ represented by $\sin(\omega t+\phi)$. In order to obtain the in-phase demodulated component x(t) and quadrature demodulated component y(t) of input single sideband wave f(t) from delayed single sideband input signal s(t) and the Hilbert transform ŝ(t), appropriate multiplications and summations of the various input waves are performed by multipliers 12, 13, 14, 15 and summers 17 and 18 respectively, as is described in detail below.

Generation of x(t), the in-phase demodulated component of the input single sideband signal, is as follows: The in-phase component of the local oscillator and the single sideband input signal are multiplied at multiplier 13 to yield $s(t)\cos(\omega t+\phi)$ at the output thereof. The quadrature output of the local oscillator and the Hilbert transform of the single sideband input signal are multiplied at multiplier 14 to yield $\hat{s}(t)\sin(\omega t+\phi)$ at the output thereof. The output of multiplier 14 is then substracted from the output of multiplier 13 via summer 18 to yield the in-phase demodulated wave x(t) at the output thereof. The value of x(t) is given by Equation (4a).

It will be noted that although there was a pre-oscillator delay at Hilbert splitter 11, there is no post-oscillator delay, since x(t) is generated solely by the operation of multiplication and subtraction. Thus, x(t), the in-phase demodulated component of the input single sideband signal, is generated without delay with respect to local oscillator 16.

The generation of y(t), the quadrature demodulated component of the input single sideband signal, proceeds in an analogous manner. The single sideband input signal and the quadrature component of the local oscillator are multiplied at multiplier 15 to obtain $s(t)\sin(\omega t+\phi)$ at the output thereof. The Hilbert transform of the single sideband input signal and the in-phase component of the local oscillator are multiplied at multiplier 12 to obtain $\hat{s}(t)\cos(\omega t+\phi)$ at the output. The outputs of multiplier 12 and 15 are then summed and inverted by summer 17 to yield the quadrature demodulated wave y(t) at the output thereof. The value of y(t) is given by Equation (6). It will be noted that the generation of the quadrature demodulated component of the input single sideband signal is accomplished solely by multiplying and adding, thus introducing no delay between quadrature demodulated wave y(t) and local oscillator 16.

Generation of the baseband data waveform f(t) from the in-phase demodulated component wave x(t) is accomplished by detector 19. For a binary data signal, detector 19 may be a decision circuit which compares the value of x(t) with the ideal binary signal threshold in order to determine the true value f(t) of the noise corrupted in-phase component x(t). In other words, the detector compares the actual value of x(t) with a threshold to decide what x(t) should have been. This is the value of f(t). For example, in a single sideband data transmission system, suppose a binary 1 is +1 volt and binary 0 is −1 volt. The value of f(t) will be ±1 volt. Assume x(t) has a current value +1.1 volt. By comparing x(t) to the threshold (0 volts), the value of the baseband data, here +1 volt, is detected. Conversely, assume x(t) has the value of −0.9 volt. By comparing x(t) to the threshold (0 volts) the value of the baseband data, here −1 volt, is detected. It will be noted that in detecting the baseband data waveform f(t) from the in-phase demodulated component wave x(t) no delay is introduced.

It will be realized by those skilled in the art that in order for detector 19 to operate properly the amplitude of the input single sideband signal must be stable over time. If the amplitude of the single sideband input wave varies then the amplitude of x(t) will vary, and detector 19 cannot make the proper decision as to the value of x(t) using a time invariant threshold. The amplitude of x(t) must be stable relative to the threshold values upon which detector 19 operates.

It will be noted, however, that the gain of data transmitted over telephone lines is amplitude stable by nature. Detector 19 will thus always operate properly. In the event that the input single sideband signal is subject to amplitude instability, a gain control circuit may be inserted at the receiver ahead of Hilbert splitter 11 to maintain a stable amplitude.

Thus far, the in-phase demodulated component x(t), the quadrature demodulated component y(t) and the detected baseband data wave f(t) have been generated at the output of summer 18, the output of summer 17, the output of detector 19, respectively. Each of x(t), y(t), and f(t) was generated without delay with respect to local oscillator 16. These three quantities namely x(t), y(t), and f(t), may be algebraically combined to generate the phase error signal. It will be recalled that in Pickholtz, the Hilbert transform of f(t) had to be generated in order to derive the phase error signal. Since generation of the Hilbert transform of f(t) required delay, the phase error signal therefore was delayed with respect to the local oscillator and could not track rapid phase jitter.

In contrast, function generator 20 need not generate the Hilbert transform f(t) in order to generate the phase error signal $\phi$. Function generator 20 generates an expression for the smaller value of $\phi$ given by Equation (10). This function is generated purely algebraically via the addition, subtraction, multiplication, division and square root functions. As such, it may be generated without delay with respect to x(t), f(t) and y(t). Function generator 20 may be implemented by a collection of summers, multipliers, dividers, squarers, and square rooters, or may be implemented digitally via a table look-up in read only memory. Analog and digital circuitry for generating an algebraic function is well known to those having skill in the art, and will not be described here.

The phase error signal output of function generator 20 is applied to local oscillator 16 in a feedback arrangement. The oscillation of oscillator 16 is adjusted by the amount of the phase error signal to thereby synchronize the local oscillator with the rapidly jittering single sideband input signal s(t). The technique for adjusting the phase of the local oscillator by a phase error signal are well known to those skilled in the art.

It will be noted that the circuit of FIG. 1 will track rapid phase jitter because there is no delay in generating the phase error signal and feeding it back to the local oscillator. In the entire post-oscillator feedback loop, i.e., multipliers 12, 13, 15, 16, summers 17 and 18, detector 19, and function generator 20, all manipulations are purely algebraic and involve no delay. The only delay in the circuit of FIG. 1 introduced is by Hilbert splitter 11, and occurs before the demodulation by oscillator 16.

Single Sideband Receiver Employing a Second Embodiment of the Invention

While the circuit of FIG. 1 can precisely track rapid phase jitter, it will be realized that function generator will of necessity be complex and expensive. As previously analyzed, it is possible to simplify phase error signal generation by utilizing the fact that phase jitter is typically of small amplitude, i.e., plus or minus a few degrees. Using this assumption, an approximate expression for the phase error signal is given by Equation (13). For the small phase errors commonly encountered in the transmission of digital data over phone lines this approximate expression is quite accurate indeed.

Figure 2:
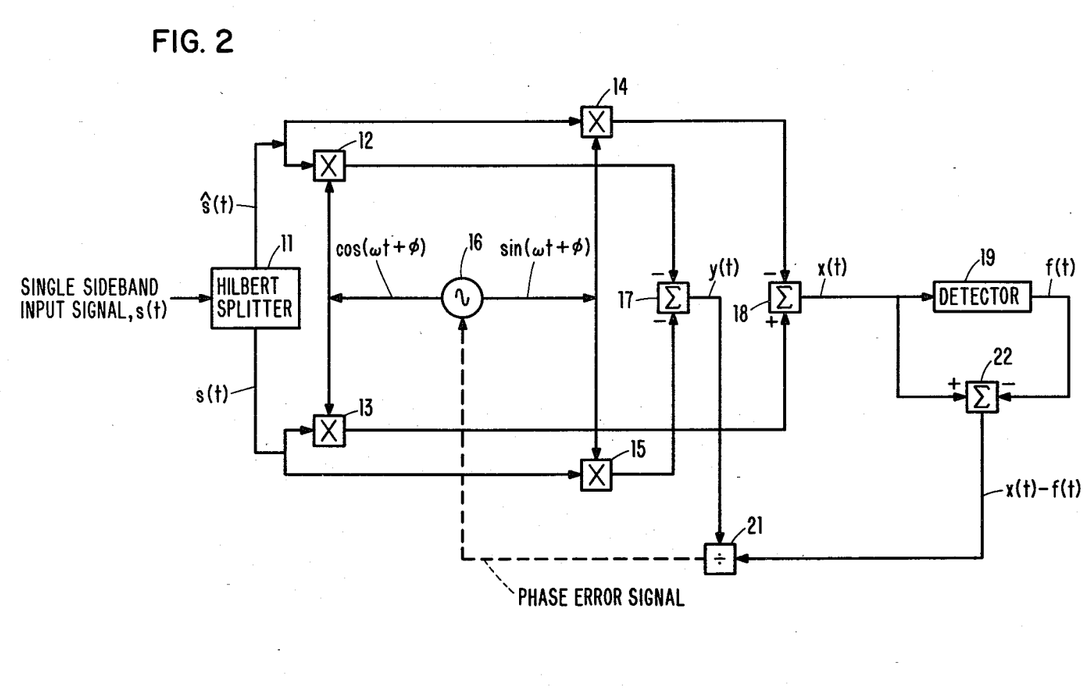
FIG. 2 is a block diagram of a second embodiment of the single sideband receiver of the invention.

The circuit of FIG. 2 generates the expression of Equation (13) as the phase error signal. Generation of in-phase demodulated component x(t), quadrature demodulated component y(t), and baseband data wave f(t), via Hilbert splitter 11, multipliers 12, 13, 14 and 15, oscillator 16, summers 17 and 18 and detector 19, is precisely the same as in FIG. 1. Analysis of the circuit of FIG. 2 will therefore begin at the output of summer 17, summer 18, and detector 19 with signals y(t), x(t) and f(t), respectively.

At summer 22, the output of detector 19, representing the baseband data waveform f(t), is subtracted from the output of summer 18, representing the in-phase demodulated component waveform x(t), to obtain the function x(t)−f(t) at the output thereof. At divider 21, The output of summer 22, representing the functions x(t)−f(t), is divided by the output of summer 17, representing the quadrature demodulated component, to generate the function [x(t)−f(t)]/y(t). The output of divider 21 is the phase error signal which is fed back to the local oscillator as was described with regard to FIG. 1.

Conclusion

FIGS. 1 and 2 disclosed two receivers for demodulating single sideband data which is subject to rapid phase jitter. The receiver of FIG. 1 is more complex, and exactly compensates for rapid phase jitter. The receiver of FIG. 2 is less complex and can only approximately compensate for rapid phase jitter. However, for small values of phase jitter typically encountered, the approximate compensation provided by the simplified circuit of FIG. 2 yields excellent results.

Both receivers track rapid phase jitter because there is no delay introduced in the post-oscillator feedback loop; i.e., from the point when the output of the local oscillator is applied to the single sideband input wave to the print where the phase jitter of the single sideband input wave is calculated and a correction for the phase jitter is applied to the local oscillator. The only delay in the receiver is that of Hilbert splitter 11. Since this delay occurs before the local oscillator is applied, it has no effect on the speed of the post-oscillator feedback loop.

There is no delay in the post-oscillator feedback loop because all components therein perform algebraic functions, e.g., mulitply, add, etc. Of course, any physical circuit component contributes a minute delay despite the fact that it is represented mathematically by an algebraic function. In the receivers of FIGS. 1 and 2 the sum of all such delays in quite small with respect to a single oscillation of the oscillator. When this is so, the phase error signal is generated rapidly enough to adjust the oscillator while the jitter is still present in the single sideband input signal. If the delay introduced by the circuit components is comparable to that of the frequency of oscillation, then by the time the phase error signal is derived, the oscillator will have begun a new oscillation cycle and the phase jitter in the old oscillation will no longer be correctable. For example, if a Hilbert transform had to be generated within the post-oscillator feedback loop, the consequent delay would be many times that of the oscillator frequency. By the time the phase error signal was calculated, the oscillator would have continued oscillating through many cycles and correction of the original phase error would be impossible.

Other embodiments of the invention will occur to those skilled in the art. Any algebraic function of $\phi$, whether or not derived from Equation (8) and whether approximate or exact, may be used to generate a phase error signal for tracking rapid phase jitter. Delays may occur within the receiver provided they occur outside the post-oscillator feedback loop.

Whereas I have illustrated and described the preferred embodiment of my invention, it is to be understood that I do not limit myself to the precise constructions herein disclosed and the right is reserved to all changes and modifications coming within the scope of the invention as defined in the appended claims.

I claim:

1. Apparatus for receiving a single sideband input wave, the phase of which is subject to rapid jitter, comprising:
   first means, connected to said single sideband input wave for generating a delayed replica of said single sideband input wave further subject to rapid phase jitter; and
   second means, connected to said first means, for deriving the amount of phase jitter present in said delayed replica of said single sideband input wave, said second means including demodulation and detection means to provide in-phase and quadrature phase single sideband components and a detected baseband data waveform and combining means for algebraically combining said in-phase demodulated component, said quadrature phase demodulated component, and said baseband data waveform, to obtain said phase jitter amount, said second means further cancelling the derived phase jitter from said delayed replica of said single sideband input wave without further delay with respect to said delayed replica of said single sideband input wave.

2. Apparatus for receiving a single sideband input wave, the phase of which is subject to rapid jitter, comprising:
   demodulating means, connected to said single sideband input wave, for generating a delayed replica of said single sideband input wave, and for generating an in-phase demodulated component a quadrature demodulated component, and a baseband data waveform from said delayed replica of said single sideband input wave, without further delay with respect to said delayed replica of said single sideband input wave;
   combining means, connected to said demodulating means, for deriving the amount of phase jitter present in said delayed replica of said single sideband input wave, by combining said in-phase demodulated component, said quadrature demodulated component and said baseband data waveform, the amount of phase jitter being derived without delay with respect to said in-phase demodulated component, said quadrature demodulated component and said baseband data waveform; and
   feedback means connected to said combining means and said, demodulating means, for cancelling the derived phase jitter from said in-phase demodulated component, said quadrature demodulated component and said baseband data waveform.

3. Apparatus for receiving a single sideband input wave, the phase of which is subject to rapid jitter, comprising:
   means, connected to said single sideband input wave, for generating a delayed replica of said single sideband input wave further subject to rapid phase jitter;
   a local oscillator for generating a local oscillator wave at the output thereof, the phase of said local oscillator wave being adjustable by a phase error signal applied to the input thereof; and
   demodulating, detecting and combining means connected to said delayed replica generating means and the input and output of said local oscillator for sending a phase error signal to said local oscillator, said phase error signal representing the amount of phase jitter present in said delayed replica of said single sideband input wave and being generated without delay with respect to said local oscillator from demodulated in-phase and quadrature phase single sideband components and a detected baseband data wavform, by algebraically combining said in-phase demodulated component, said quadrature phase demodulated component, and said baseband data waveform,
   whereby the phase of said local oscillator wave is rapidly adjusted to track the phase jitter in said single sideband input wave.

4. Apparatus for receiving a single sideband input wave, the phase of which is subject to rapid jitter, comprising:
   a local oscillator for generating a local oscillator wave, the phase of said local oscillator wave being adjustable;
   demodulating means, connected to said single sideband input wave and said local oscillator for generating an in-phase demodulated component of said single sideband input wave, a quadrature demodulated component of said single sideband input wave, and a baseband data waveform of said single sideband input wave, without delay with respect to said local oscillator wave, by combining said local oscillator wave, and said single sideband input wave; and
   combining means, connected to said demodulating means, and said local oscillator, for sending a phase error signal to said local oscillator, said phase error signal representing the amount of phase jitter present in said single sideband input wave and being generated without delay with respect to said local oscillator wave by combining said in-phase demodulated component, said quadrature demodulated component and said baseband data waveform;
   whereby the phase of said local oscillator wave is rapidly adjusted to track the phase jitter in said single sideband input wave.

5. Apparatus for receiving a single sideband input wave, the phase of which is subject to rapid jitter, comprising:
   Hilbert transform generating means connected to said single sideband input wave for generating the Hilbert transform of said single sideband input wave, and a delayed replica of said single sideband input wave with no delay between the delayed replica of the single sideband input wave and the Hilbert transform of the single sideband input wave;
   means connected to said Hilbert transform generating means for deriving the amount of phase jitter present in said delayed replica of said single sideband input wave without further delay with respect to said delayed replica of said single sideband input wave and for cancelling the derived phase jitter from said delayed replica of said single sideband input wave.

6. Apparatus for receiving a single sideband input wave, the phase of which is subject to rapid jitter, comprising:

Hilbert transform generating means connected to said single sideband input wave for generating the Hilbert transform of said single sideband input wave and a delayed replica of said single sideband input wave, with no delay between the delayed replica of the single sideband input wave and the Hilbert transform of the single sideband input wave;

demodulating means connected to said Hilbert transform generating means, for generating an in-phase demodulated component, a quadrature demodulated component, and a baseband data waveform from the Hilbert transform of said single sideband input wave and the delayed replica of said single sideband input wave, without further delay with respect to the delayed replica of said single sideband input wave;

combining means, connected to said demodulating means, for deriving the amount of phase jitter present in the delayed replica of said single sideband input wave, by combining said in-phase demodulated component, said quadrature demodulated component, and said baseband data waveform, the amount of phase jitter being derived without further delay with respect to said in-phase demodulated component, said quadrature demodulated component, said baseband data waveform; and feedback means connected to said combining means and said demodulating means, for cancelling the derived phase jitter from said in-phase demodulated component, said quadrature demodulated component and said baseband data waveform.

7. Apparatus for receiving a single sideband input wave, the phase of which is subject to rapid jitter, comprising:

Hilbert transform generating means connected to said single sideband input wave for generating the Hilbert transform of said single sideband input wave, and a delayed replica of said single sideband input wave, with no delay between the delayed replica of the single sideband input wave and the Hilbert transform of the single sideband input wave;

a local oscillator for generating a local oscillator wave, the phase of said local oscillator wave being adjustable; and combining means, connected to said Hilbert transform generating means and said local oscillator, for sending a phase error signal to said local oscillator, said phase error signal representing the amount of phase jitter present in said single sideband input wave and being generated without delay with respect to said local oscillator wave by combining said local oscillator wave, the delayed replica of said single sideband input wave and the Hilbert transform of said single sideband input wave;

whereby the phase of said local oscillator wave is rapidly adjusted to track the phase jitter in said single sideband input wave.

8. Apparatus for receiving a single sideband input wave, the phase of which is subject to rapid jitter, comprising:

Hilbert transform generating means connected to said single sideband input wave for generating the Hilbert transform of said single sideband input wave and a delayed replica of said single sideband input wave, with no delay between the delayed replica of the single sideband input wave and the Hilbert transform of the single sideband input wave;

a local oscillator for generating a local oscillator wave, the phase of said local oscillator wave being adjustable;

demodulating means connected to said Hilbert transform generating means and said local oscillator, for generating an in-phase demodulated component, a quadrature demodulated component, and a baseband data waveform from the Hilbert transform of said single sideband input wave and the delayed replica of said single sideband input wave, without delay with respect to said local oscillator wave, by combining the delayed replica of said single sideband input wave with the Hilbert transform of said single sideband wave and said local oscillator wave; and combining means, connected to said demodulating means, for sending a phase error signal to said local oscillator, said phase error signal representing the amount of phase jitter present in said single sideband input wave and being generated without delay with respect to said local oscillator wave by combining said in-phase demodulated component, said quadrature demodulated component and said baseband data waveform;

whereby the phase of said local oscillator wave is rapidly adjusted to track the phase jitter in said single sideband input wave.

9. Apparatus for receiving a single sideband input wave, the phase of which is subject to rapid jitter, comprising:

means, connected to said single sideband input wave, for generating a delayed replica of said single sideband input wave further subject to rapid phase jitter;

a local oscillator for generating a local oscillator wave at the output thereof, the phase of said local oscillator wave being adjustable by a phase error signal applied to the input thereof; and a post oscillator feedback loop from demodulated in-phase and quadrature phase single sideband components and a detected baseband data waveform connected to said delayed replica of said single sideband input wave and the input and output of said local oscillator, for generating a phase error signal representing the amount of phase jitter present in said delayed replica of said single sideband input wave, said phase error signal generated by algebraically combining said in-phase demodulated component, said quadrature phase demodulated component, and said baseband data waveform, and for feeding back said phase error signal to the input of said local oscillator, the generation of said phase error signal by said post-oscillator feedback loop operating without delay with respect to said local oscillator wave, whereby the phase of said local oscillator wave is rapidly adjusted to track the phase jitter in said single sideband input wave.

10. Apparatus for receiving a single sideband input wave, the phase of which is subject to rapid jitter, comprising:

Hilbert transform generating means connected to said single sideband input wave for generating the Hilbert transform of said single sideband input wave and a delayed replica of said single sideband input wave, with no delay between the delayed replica of the single sideband input wave and the Hilbert transform of the single sideband input wave;

a local oscillator for generating a local oscillator wave, the phase of said local oscillator wave being adjustable; and a post oscillator feedback loop including demodulating, detecting and combining means connected to said Hilbert transform generating means and said local oscillator, for generating a phase error signal representing the amount of phase jitter present in said single sideband input wave, said phase error signal generated from demodulated in-phase and quadrature phase single sideband components and a detected baseband data waveform by algebraically combining said in-phase demodulated component, said quadrature phase demodulated component, and said baseband data waveform, and for feeding back said phase error signal to said local oscillator, the generation of said phase error signal by the post-oscillator feedback loop operating without delay with respect to said local oscillator wave.

11. The apparatus of claims 3, 4, 7, 8, 9 or 10 wherein said local oscillator wave comprises an in-phase local oscillator wave and a quadrature phase local oscillator wave.

12. The apparatus of claims 5, 6, 7 or 10 wherein said Hilbert transform generating means is a Hilbert splitter.

13. The apparatus of claims 2, 4, 6 or 8 wherein said demodulating means includes a detector and wherein the baseband data waveform is generated by passing the in-phase demodulated component through said detector.

14. The apparatus of claims 2 or 6 wherein said combining means derives an approximation to the amount of phase jitter present in said single sideband input wave.

15. The apparatus of claims 4 or 8 wherein the phase error signal generated by said combining means represents the approximate amount of phase jitter present in said single sideband input wave.

16. The apparatus of claims 2 or 6 wherein said combining means derives the amount of phase jitter present in said single sideband input wave by subtracting said baseband data waveform from said in-phase demodulated component and dividing the result by said quadrature demodulated component.

17. The apparatus of claims 4 or 8 wherein said combining means generated said phase error signal by subtracting said baseband data waveform said said in-phase demodulated component and dividing the result by said quadrature demodulated component.

18. The apparatus of claims 2 or 6 wherein said combining means derives the phase jitter present in said single sideband input wave by solving the equation $$y(t) \sin \phi + f(t) = x(t) \cos \phi$$

for $\phi$, where $\phi$ represents said amount of phase jitter present in said single sideband input wave; x(t) represents said in-phase demodulated component; y(t) represents said quadrature demodulated component and f(t) represents said baseband data waveform.

19. The apparatus of claims 4 or 8 wherein said phase error signal is generated by solving the equation $$y(t) \sin \phi + f(t) = x(t) \cos \phi$$

for $\phi$, where $\phi$ represents said phase error signal; x(t) represents said in-phase demodulated component; y(t) represents said quadrature demodulated component and f(t) represents said baseband data waveform.

20. The apparatus of claims 2 or 6 wherein said combining means is a function generator, for deriving said amount of phase jitter present in said single sideband input wave by generating the smaller of the two values of the function $$\arcsin \left[ \frac{-y(t)f(t) \pm x(t) \sqrt{[x(t)]^2 + [y(t)]^2 - [f(t)]^2}}{[x(t)]^2 + [y(t)]^2} \right]$$

where x(t) is said in-phase demodulated component, y(t) is said quadrature demodulated component, and f(t) is said baseband data waveform.

21. The apparatus of claims 4 or 8 wherein said combining means is a function generator, for generating said phase error signal by generating the smaller of the two values of the function $$\arcsin \left[ \frac{-y(t)f(t) \pm x(t) \sqrt{[x(t)]^2 + [y(t)]^2 - [f(t)]^2}}{[x(t)]^2 + [y(t)]^2} \right]$$

where x(t) is said in-phase demodulated component, y(t) is said quadrature demodulated component, and f(t) is said baseband data waveform.

22. Apparatus for receiving a single sideband input wave, the phase of which is subject to rapid jitter, comprising:

a Hilbert splitter connected to said single sideband input wave, for generating the Hilbert transform of said single sideband input wave and a delayed replica of said single sideband input wave, said Hilbert transform and said delayed replica being generated in synchronization with one another, a local oscillator for generating local oscillator waves including an in-phase local oscillator wave and a quadrature local oscillator wave, the phase of said local oscillator waves being adjustable; demodulating means, connected to said Hilbert splitter and said local oscillator, for generating an in-phase demodulated component, a quadrature demodulated component and a baseband data waveform from said delayed replica of said single sideband input wave, without delay with respect to said local oscillator waves by combining said local oscillator waves, said delayed replica of said single sideband input wave and said Hilbert transform; and combining means, connected to said demodulating means, for sending a phase error signal to said local oscillator, said phase error signal representing the amount of phase jitter present in said delayed replica of said single sideband input wave and being generated without delay with respect to said local oscillator waves by combining said in-phase demodulated component, said quadrature demodulated component and said baseband data waveform;

whereby the phases of said local oscillator waves are rapidly adjusted to track the phase jitter in said single sideband input wave.

23. The apparatus of claim 22 wherein said demodulating means includes:
a first multiplier, for multiplying said delayed replica of said single sideband input wave by said in-phase local oscillator wave,
a second multiplier, for multiplying said Hilbert transform by said quadrature local oscillator wave, and
a first subtractor for subtracting the output of said second multiplier from the output of said first multiplier to obtain said in-phase demodulated component.

24. The apparatus of claim 22 wherein said demodulating means includes:
a third multiplier, for multiplying said delayed replica of said single sideband input wave by said quadrature local oscillator wave,
a fourth multiplier, for multiplying said Hilbert transform by said in-phase local oscillator wave, and
a summer/inverter for adding the output of said third multiplier to the output of said fourth multiplier and inverting the result, to obtain said quadrature demodulated component.

25. The apparatus of claim 23 wherein said demodulating means further includes:
a detector connected to the output of said first subtractor, for obtaining said baseband data waveform from said in-phase demodulated component.

26. The apparatus of claim 22 wherein said combining means comprises:
a second subtractor for subtracting said baseband data waveform from said in-phase demodulated wave, and
a first divider, for dividing the output of said second subtractor by said quadrature demodulated wave to obtain said phase error signal.

27. The apparatus of claim 22 wherein said combining means is a function generator, for generating said phase error signal by generating the smaller of the two values of the function $$\arcsin\left[\frac{-y(t)f(t) \pm x(t)\sqrt{[x(t)]^2 + [y(t)]^2 - [f(t)]^2}}{[x(t)]^2 + [y(t)]^2}\right]$$

where x(t) is said in-phase demodulated component, y(t) is said quadrature demodulated component, and f(t) is said baseband data waveform.

28. Apparatus for receiving a single sideband input wave, the phase of which is subject to rapid jitter, comprising:
a Hilbert splitter connected to said single sideband input wave, for generating the Hilbert transform of said single sideband input wave and a delayed replica of said single sideband input wave, said Hilbert transform and said delayed replica of said single sideband input wave being generated in synchronization with one another,
a local oscillator for generating local oscillator waves including an in-phase local oscillator wave and a quadrature local oscillator wave, the phase of said local oscillator waves being adjustable;
first, second, third and fourth multipliers connected to said Hilbert splitter and said local oscillator;
said first multiplier for multiplying said delayed replica of said single sideband input wave by said in-phase local oscillator wave,
said second multiplier for multiplying said Hilbert transform by said quadrature local oscillator wave,
said third multiplier for multiplying said delayed replica of said single sideband input wave by said quadrature local oscillator wave,
said fourth multiplier for multiplying said Hilbert transform by said in-phase local oscillator wave,
a first subtractor for subtracting the output of said second multiplier from the output of said first multiplier,
a first summer/inverter for adding the output of said third multiplier to the output of said fourth multiplier and inverting the result,
a detector connected to the output of said first subtractor,
a second subtractor for subtracting the output of said detector from the output of said first subtractor,
a first divider for dividing the output of said second subtractor by the output of said first summer/inverter, and
feedback means for feeding the output of said divider to said local oscillator,
whereby the phase of said local oscillator is rapidly adjusted to track the phase jitter in said single sideband input wave.

* * * * *